US012188291B2

(12) United States Patent
Yun et al.

(10) Patent No.: US 12,188,291 B2
(45) Date of Patent: Jan. 7, 2025

(54) IMPACT NOISE PREVENTION DEVICE FOR OPENING/CLOSING DOOR

(71) Applicant: Joong Bo Yun, Seoul (KR)

(72) Inventors: Jung Jae Yun, Busan (KR); Joong Bo Yun, Seoul (KR); Je Sung Yun, Changwon-si (KR)

( * ) Notice: Subject to any disclaimer, the term of this patent is extended or adjusted under 35 U.S.C. 154(b) by 10 days.

(21) Appl. No.: 18/341,080

(22) Filed: Jun. 26, 2023

(65) Prior Publication Data

US 2024/0018817 A1 Jan. 18, 2024

(30) Foreign Application Priority Data

Jul. 13, 2022 (KR) ........................ 10-2022-0086130

(51) Int. Cl.
*E05F 5/02* (2006.01)
*E05C 17/04* (2006.01)

(52) U.S. Cl.
CPC .............. *E05F 5/02* (2013.01); *E05C 17/045* (2013.01)

(58) Field of Classification Search
CPC ........ E05C 17/04; E05C 17/045; E05C 17/12; E05C 17/14; E05C 17/16; E05C 17/166; E05C 17/50; E05C 19/08; E05C 19/12; E05C 17/443; E05F 5/02; E05F 5/04; E05F 2005/046; E05Y 2800/41
USPC .......................................................... 292/202
See application file for complete search history.

(56) References Cited

U.S. PATENT DOCUMENTS

| | | | | | |
|---|---|---|---|---|---|
| 1,037,641 | A * | 9/1912 | Koch, Jr. | E05F 5/04 | 16/83 |
| 1,117,230 | A * | 11/1914 | Page | E05F 5/04 | 16/83 |
| 1,117,253 | A * | 11/1914 | Sargent et al. | E05F 5/04 | 16/83 |
| 1,399,145 | A * | 12/1921 | Naslin | E05F 5/04 | 16/83 |
| 1,459,238 | A * | 6/1923 | Naslin | E05F 5/02 | 16/83 |
| 1,685,023 | A * | 9/1928 | Cowan | E05F 5/04 | 16/83 |
| 2,107,699 | A * | 2/1938 | Groeschel | E05F 5/04 | 16/86 A |
| 2,175,403 | A * | 10/1939 | Larson | E05F 5/04 | 16/83 |

(Continued)

FOREIGN PATENT DOCUMENTS

| | | | | |
|---|---|---|---|---|
| DE | 202016007241 U1 * | 2/2017 | | |
| EP | 3045644 A1 * | 7/2016 | E05F 5/04 |
| EP | 3109380 A1 * | 12/2016 | E05B 17/005 |

*Primary Examiner* — Jeffrey O'Brien
(74) *Attorney, Agent, or Firm* — KORUS Patent, LLC; Seong Il Jeong

(57) ABSTRACT

The present invention relates to a prevention device that is installed on a door frame of an opening/closing door to prevent sudden closing of the opening/closing door, and more particularly, to an impact noise prevention device for an opening/closing door which is configured to install wings on one side of a hinge fixed to the door frame, allows the wings to rotate around the hinge by the force of the wind passing between the opening/closing door and the door frame, i.e. the wind force, thereby reducing the impact and noise caused by the sudden closing of the opening/closing door, and is installed in the door frame to conveniently perform its installment and removal.

6 Claims, 7 Drawing Sheets

(56) References Cited

U.S. PATENT DOCUMENTS 2,807,044 A * 9/1957 Blondy ..................... E05F 5/04 16/86 A
3,055,043 A * 9/1962 Luttner, Jr. ............... E05F 5/04 292/87
3,200,434 A * 8/1965 Jarnot ....................... E05F 5/04 292/264
3,800,360 A * 4/1974 Knarreborg ............... E05F 5/04 16/83
4,148,509 A * 4/1979 McLennan .............. E05C 19/08 292/202
4,368,555 A * 1/1983 Salerno ................... E05F 5/003 16/83
4,788,837 A * 12/1988 MacFarlane ............ E05C 19/08 70/5
4,982,474 A * 1/1991 Kjellstrom .............. E05C 17/04 16/83
5,123,685 A * 6/1992 Donovan ................ E05C 17/04 16/86 A
D346,109 S * 4/1994 Comaianni .................... D8/402
5,577,783 A * 11/1996 Kaminski ............. E05C 17/166 292/270
5,590,922 A * 1/1997 Hucknall ................ E05C 3/048 292/202
6,244,636 B1 * 6/2001 Rissone .................. E05C 17/50 292/342
6,327,743 B1 * 12/2001 Rashid .................... E05C 17/04 16/86 A
6,510,587 B2 * 1/2003 Urschel ..................... E05F 5/02 16/83
6,550,186 B2 * 4/2003 Haq .......................... E06B 7/36 16/83
7,360,804 B1 * 4/2008 Fidali .................... E05C 17/166 292/288
8,060,982 B2 * 11/2011 Magoz ...................... E05F 5/04 16/83
8,276,240 B2 * 10/2012 Ritachka ................... E05F 5/06 16/83
8,595,899 B2 * 12/2013 McRoskey ................ E05F 5/04 16/83
8,776,316 B2 * 7/2014 McRoskey ................ E05F 5/02 16/83
8,950,040 B2 * 2/2015 McRoskey ............. E05F 5/003 16/83
9,169,680 B2 * 10/2015 Kim .......................... E05D 3/02
9,482,034 B2 * 11/2016 Atkinson, Jr. .......... E05C 3/044
9,644,414 B1 * 5/2017 Earp, Jr. ................... E05F 5/02
9,903,144 B2 * 2/2018 Gibson ................. E05C 17/025
10,094,158 B2 * 10/2018 McRoskey ................ E05F 5/06
10,450,787 B1 * 10/2019 Jaffee ........................ E05F 5/04
11,319,736 B2 * 5/2022 Thomas .............. E05B 17/0045
2002/0157319 A1 * 10/2002 Haq .......................... E05F 5/02 49/383
2005/0241238 A1 * 11/2005 Garvey ..................... E05F 5/04 49/383
2009/0058104 A1 * 3/2009 Huang .................... E05C 17/00 292/288
2010/0156121 A1 * 6/2010 Badia .................... E05B 17/007 292/216
2011/0154610 A1 * 6/2011 Sanz ......................... E05F 5/04 16/82
2012/0030902 A1 * 2/2012 Dufek ....................... E05F 5/04 16/85
2012/0042590 A1 * 2/2012 Ben-David Yosef ..... E05F 5/04 49/70
2016/0362911 A1 * 12/2016 Sussman ............. E05B 17/0041
2020/0263472 A1 * 8/2020 Pruja ....................... E05C 17/50
2022/0243513 A1 * 8/2022 Agostino .................. E05F 5/02

* cited by examiner

IMPACT NOISE PREVENTION DEVICE FOR OPENING/CLOSING DOOR

TECHNICAL FIELD

The present invention relates to a prevention device that is installed on a door frame of an opening/closing door to prevent sudden closing of the opening/closing door, and more particularly, to an impact noise prevention device for an opening/closing door which is configured to install wings on one side of a hinge fixed to the door frame, allows the wings to rotate around the hinge by the force of the wind passing between the opening/closing door and the door frame, i.e. the wind force, thereby reducing the impact and noise caused by the sudden closing of the opening/closing door, and is installed in the door frame to conveniently perform its installment and removal.

BACKGROUND ART

Generally, an opening/closing door is often used for entry and exit purposes inside a residential or office building. Such opening/closing door is often left in an open state for airing and ventilation for a comfortable indoor environment. If the door is left in the open state as it is, it often closes suddenly due to an unexpected strong wind coming in from the outside. Moreover, just before the opening/closing door is closed by the wind coming in from the outside, the wind speed of the draft passing through a narrow space between the door and the door frame is rapidly accelerated, and at this time, as the door is suddenly closed, a large impact and a large noise are generated.

The problems caused by the sudden and frequent closing of such opening/closings by strong winds are that safety accidents such as injury accidents occur frequently, including loud noise, damage, and cracks due to strong impact between the door and the door frame, and getting indoor elderly people, infant and children' hand caught in the door, and loud noise startle people and disturbs the sleep of infants and children.

Existing tools with the function of door closure prevention, that is, a fixture under the door, a tool for fitting the side of the door, and other devices, not only have the hassle of having to be directly installed and removed by the user to prevent the door from closing, but also always be operated directly by the user, and when the act of fixing or fitting is momentarily missed in order to prevent the door from closing due to strong wind from outside, the user is exposed to accidents that may occur due to unexpected door closures, and thus, cannot be completely freed from the dangerous situation.

As the related prior art, Korean Registration Patent No. 10-1084538 suggests a door closing prevention stopper.

The above patent suggests a door closing prevention stopper in which an attachment plate 11 attached to a door frame 22 forms a fitting tool 13 so that the pedestal 12 is inserted and rotated, and when inserted into the fitting tool 13 and rotated to either side, a support 12 is configured to have a length that abuts against the door 21 and prevents the door 21 from closing, characterized in that the supports 12' having various lengths are inserted into the attachment plate 11 to form a plurality of fitting tools 13 that rotate, and a plurality of supports 12' having different lengths are configured so that the positions of contact with the door 21 are different. However, the support always hits the specific position of the door, and the longer the period of use, the more the door is damaged. In particular, when the door needs to be completely closed, the support must be completely rotated, which leads to discomfort in use.

As another related prior art, Korean Registration Utility Model Publication No. 20-0362906 suggests an opening/closing door closing prevention device, which is provided in the space between the opening/closing door and the door frame to support the opening/closing door so that it does not close in the open state, characterized in that the device comprises a first support plate 10 in which one side is formed with a first hinge shaft 11 and both ends are formed to be able to perform a seesaw movement around the first hinge shaft 11; a second support plate 20 in which one side is formed with a second hinge shaft 21, and both ends are formed so as to be able to perform a seesaw movement around the second hinge shaft 21, and are coupled to intersect with the first support plate 10; a pin shaft 30 that axially couples the first hinge shaft 11 of the first support plate 10 and the second hinge shaft 21 of the second support plate 20 on the same line; and an elastic spring 40 that is provided between the first support plate 10 and the second support plate 20 and elastically supports the first support plate 10 and the second support plate 20. However, since the opening/closing door closing prevention device must be installed by inserting it between the opening/closing door and the door frame, the installation is difficult, and the door may be difficult to close completely.

PRIOR ART LITERATURE

Patent Literature (Patent Literature 0001) Korean Registration Patent No. 10-1084538 (published on Nov. 17, 2011)

(Patent Literature 0002) Korean Registration Utility Model Publication No. 20-0362906 (published on Sep. 22, 2004)

DETAILED DESCRIPTION OF THE INVENTION

Technical Problem

Therefore, an object of the present invention is to provide an impact noise prevention device for an opening/closing door that is installed on the door frame of the opening/closing door to prevent the opening/closing door from suddenly closing, wherein a wing is provided on one side of the hinge fixed to the door frame, the wing can be rotated around the hinge by the force of the wind passing between the opening/closing door and the door frame, that is, the wind power, thereby reducing the impact and noise generated by the rapid closing of the opening/closing door, and the device is installed on the door frame, so that its installation and removal can be performed conveniently.

Another object of the present invention is to provide an impact noise prevention device for an opening/closing door wherein a front cushioning member is attached to the front of the wing, a cushion is attached to the front cushioning member, which absorbs the impact generated by the sudden closing of the opening/closing door, thereby reducing noise.

Yet another object of the present invention is to provide an impact noise prevention device for an opening/closing door wherein a rear cushioning member is further attached to the rear surface of the wing, and the rear cushioning member can reduce impact noise by absorbing impact generated when opening the opening/closing door.

Technical Solution

In order to achieve the above object, according to one aspect of the present invention, there can be provided an impact noise prevention device for an opening/closing door which prevents impact and noise caused by sudden closing of an opening/closing door, the device comprising: a fixed plate fixed to a door frame of the opening/closing door, a hinge fixedly coupled to the fixing plate, a rotating pipe coupled through the hinge and rotated around the hinge, and a wing fixed to the rotating pipe and rotated by the force of the wind passing between the opening/closing door and the door frame.

Advantageous Effects

An impact noise prevention device for an opening/closing door according to the present invention as described above is a device for preventing sudden closing of the opening/closing door, wherein the device is configured to install wings on one side of a hinge fixed to the door frame, allows the wings to rotate around the hinge by the force of the wind passing between the opening/closing door and the door frame, i.e. the wind force, thereby reducing the impact and noise caused by the sudden closing of the opening/closing door, and is installed in the door frame to conveniently perform its installment and removal. Further, a front cushioning member is attached to the front surface of the wing, and a cushion is attached to the front cushioning member, which absorbs the impact generated by sudden closing of the opening/closing door, thereby reducing noise, and a rear cushioning member is further attached to the rear surface of the wing, and rear cushioning member can absorb the impact generated when the opening/closing door is opened, thereby reducing the impact noise.

DETAILED DESCRIPTION OF THE EMBODIMENTS

The present invention relates to a prevention device that is installed on a door frame of an opening/closing door to prevent sudden closing of the opening/closing door, and more particularly, to an impact noise prevention device for an opening/closing door which is configured to install wings on one side of a hinge fixed to the door frame, allows the wings to rotate around the hinge by the force of the wind passing between the opening/closing door and the door frame, i.e. wind force, thereby reducing the impact and noise caused by the sudden closing of the opening/closing door, and is installed in the door frame to conveniently perform its installment and removal.

Hereinafter, preferred embodiments of the present invention will be described in detail with reference to the accompanying drawings.

Figure 1:
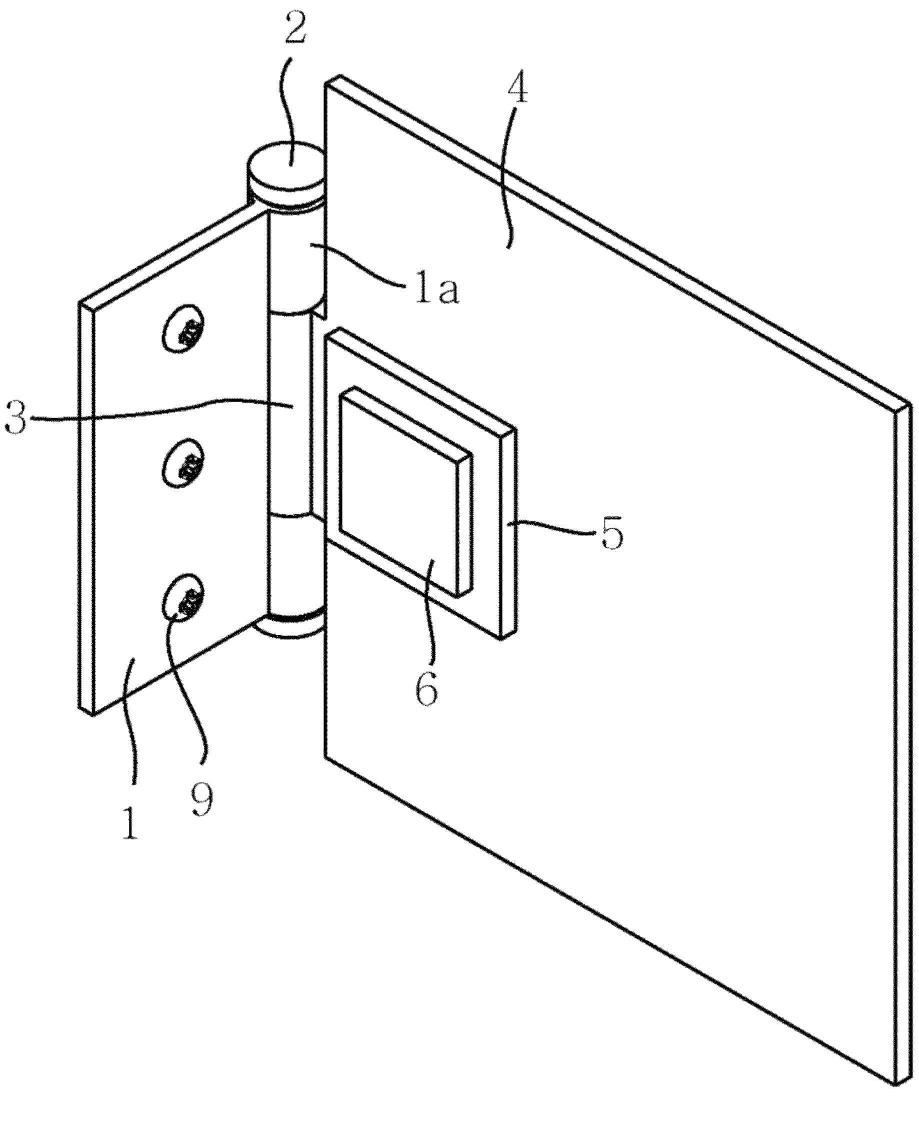
FIG. 1 is an overall configuration diagram of the present invention.
Figure 2:
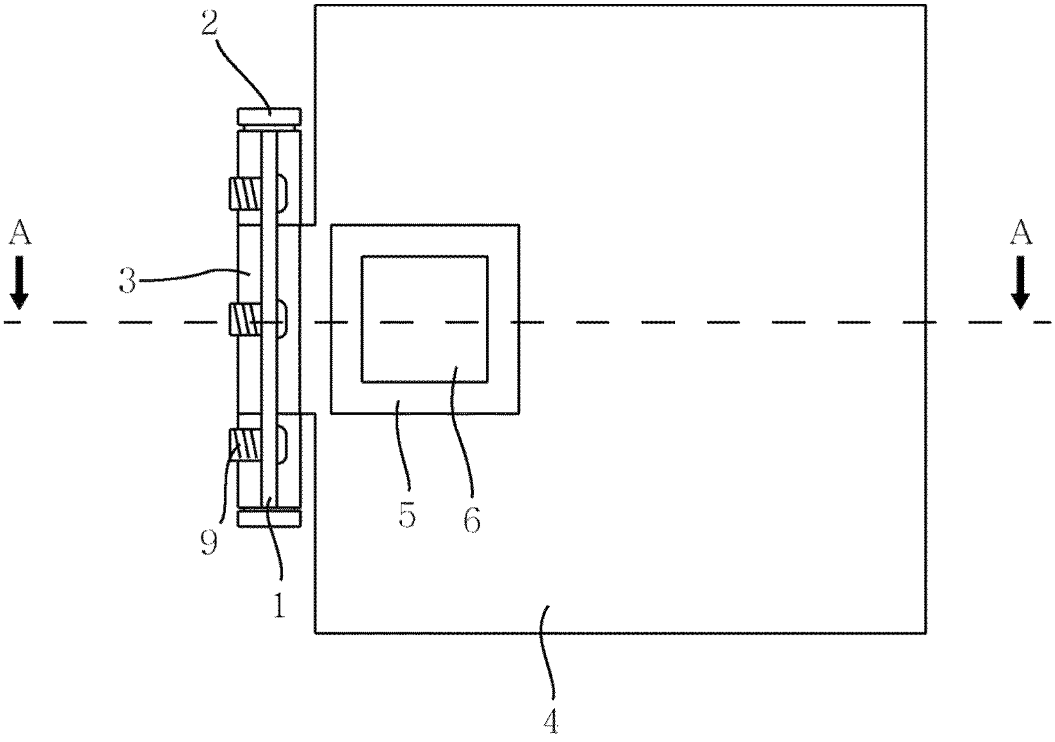
FIG. 2 is a front configuration view of the present invention.
Figure 3:
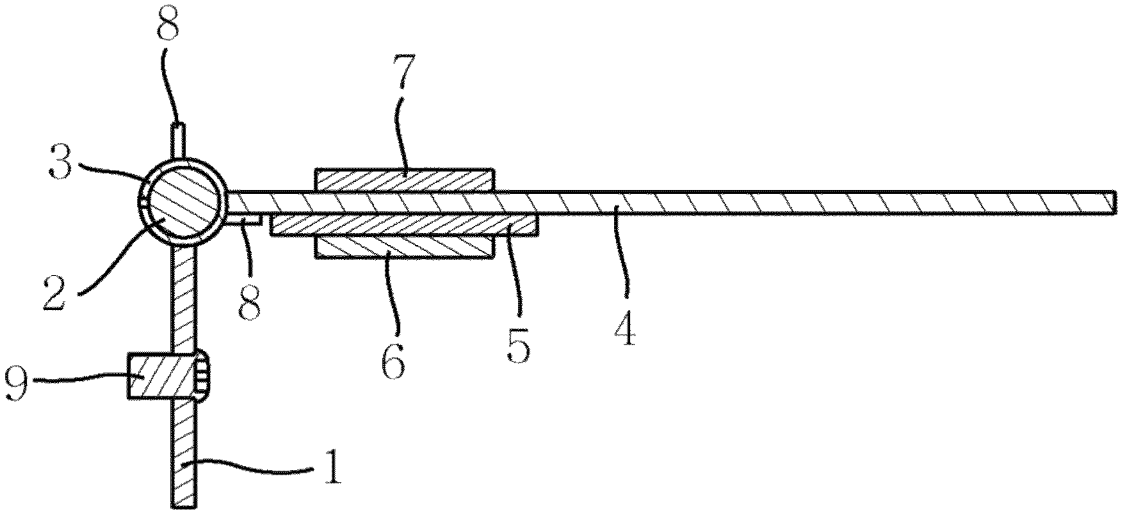
FIG. 3 is a cross-sectional view of the section A-A of FIG. 2.

FIG. 1 is an overall configuration diagram of the present invention, FIG. 2 is a front configuration view of the present invention, and FIG. 3 is a cross-sectional view of the section A-A of FIG. 2. An impact noise prevention device for an opening/closing door according to the present invention is a prevention device which prevents impact and noise caused by sudden closing of an opening/closing door 10, the device comprising: a fixed plate 1 fixed to a door frame 11 of the opening/closing door 10, a hinge 2 fixedly coupled to the fixing plate 1, a rotating pipe 3 coupled through the hinge 2 and rotated around the hinge 2, and a wing 4 fixed to the rotating pipe 3 and rotated by the force of the wind passing between the opening/closing door 10 and the door frame 11.

First, the opening/closing door 10 is a door used for entering and exiting the interior of a residential or an office building, and is a door that is closed by an opening and closing method, where a rectangular door frame 11 to which the opening/closing door is fixed by a fixing member such as a hinge is installed around the opening/closing door 10 to open and close the opening/closing door 10.

The fixing plate 1 having a bolt hole formed in the door frame 11 is fixedly coupled by bolts 9, the hinge 2 is a shaft fixed to the fixing plate 1, the rotating pipe 3 is a hollow pipe coupled in a state of being penetrated by the hinge 2 and rotated around the hinge 2, a wing 4 is installed on one side of the rotating pipe 3, and the wing 4 is rotated by the force of the wind passing between the opening/closing door 10 and the door frame 11, that is, the wind power.

Here, in the illustrated embodiment, the fixing plate 1 is fixed to the door frame 11 by bolts 9, but in some cases, the fixing plate 1 may be fixed to the door frame 11 by applying adhesive to the fixing plate 1 or using an adhesive member such as an adhesive sticker, and the fixing plate 1 itself can be made in the form of a vacuum suction plate to provide convenience of attachment and detachment.

In addition, a front cushioning member 5 is attached to the front of the wing 4, and a cushion 6 is attached to the front cushioning member 5, which absorbs the impact generated when the opening/closing door 10 is suddenly closed, thereby reducing noise.

That is, the front cushioning member 5 is a cushioning member attached to the front of the wing 4, and is installed in the structure in which a cushion 6 is further attached to the surface of the front cushioning member 5, and when the opening/closing door 10 closes, it first hits the cushion 6 and absorbs the impact, and such impact of the cushion 6 is again absorbed by the front cushioning member 5.

In the illustrated embodiment, the wing 4 is shown to be square when viewed from the front, but in some cases, it can be made in various shapes such as circular, polygonal, heart-shaped, airplane wing-shaped. In particular, when the same wind force acts, it is preferable to have a shape in which the rotational force of the blade is larger even if the area is the same.

Moreover, the front cushioning member 5 and the cushion 6 are preferably configured such that the amount of deformation of the cushion 6 is larger than the amount of deformation of the front cushioning member 5 when the same force acts on the same area.

That is, the cushion 6 is made from a relatively soft material, and the front cushioning member 5 is made from a material that is relatively harder than the cushion 6. Thus, the impact caused by the closing of the opening/closing door 10 is first absorbed by the cushion 6, and then absorbed by the double structure in which the front cushioning member 5 of a hard material absorbs again, thereby preventing the generation of loud noise.

In addition, a rear cushioning member 7 is further attached to the rear surface of the wing 4, and the rear cushioning member 7 can absorb the impact generated when the opening/closing door 10 is opened, thereby reducing the impact.

Figure 4:
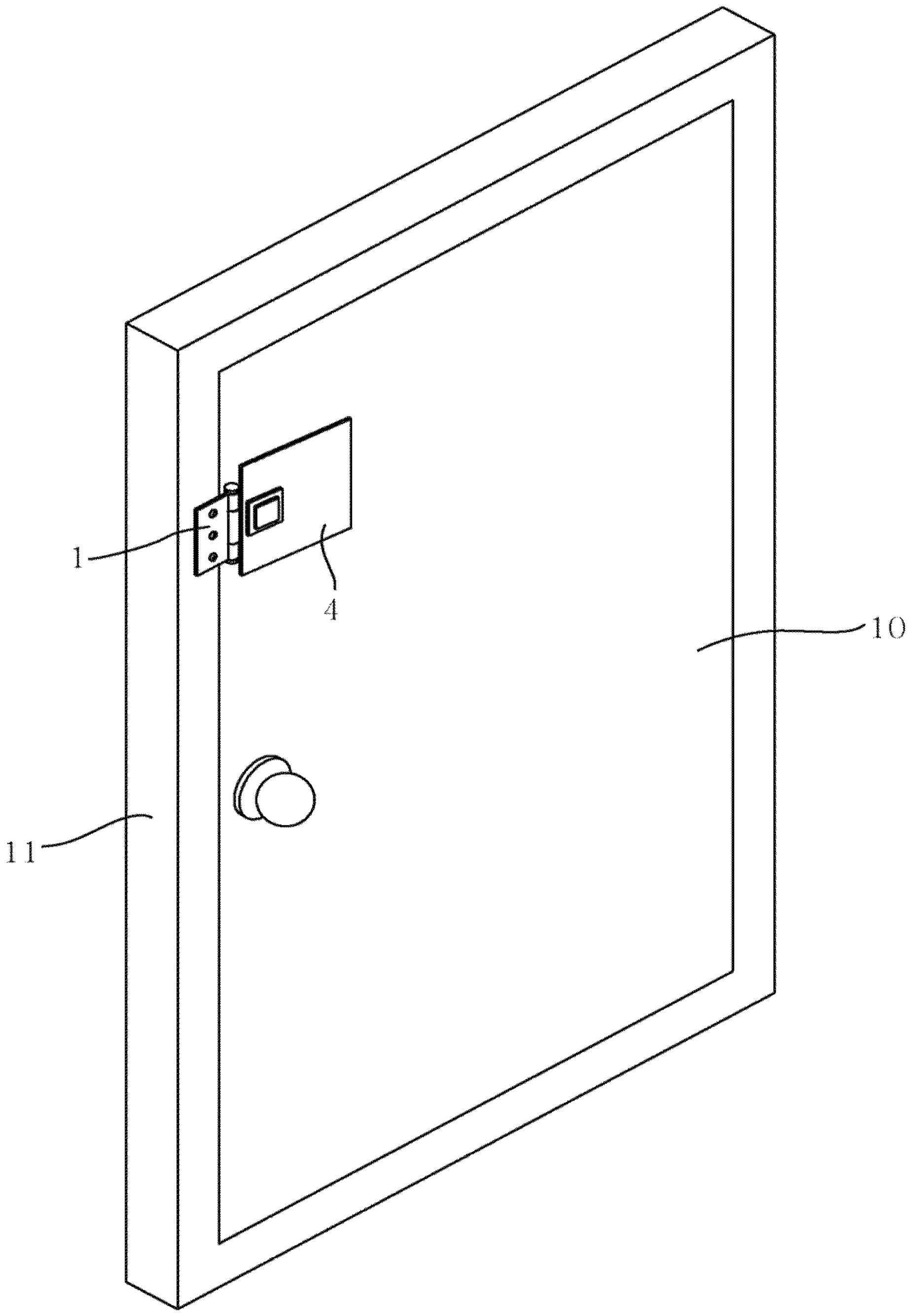
FIGS. 4 to 7 are use state diagrams of the present invention.
Figure 5:
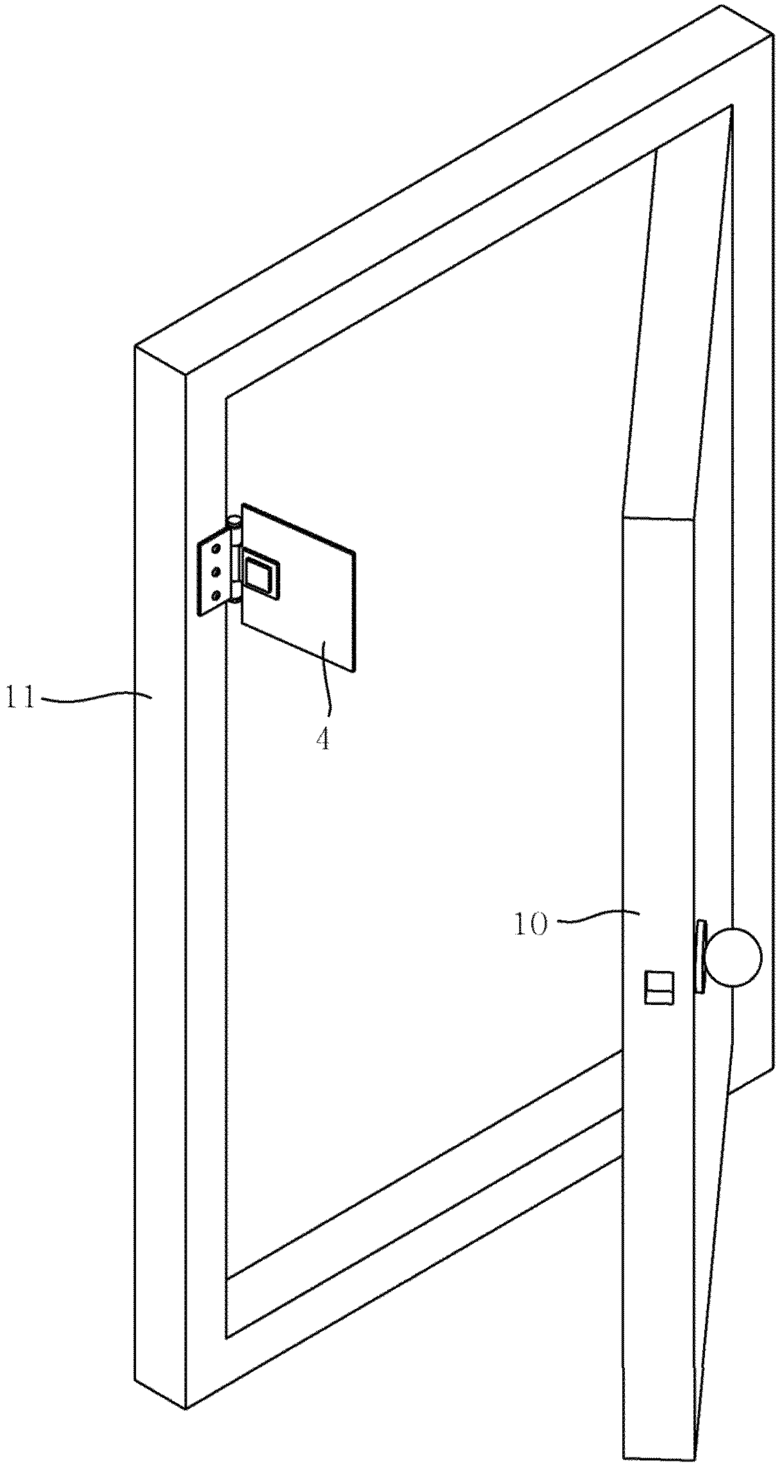

That is, when the door is opened as shown in FIG. 5 in a state where the door is closed as in the state of FIG. 4, the opening/closing door 10 collides with the rear surface of the wing 4, so that a separate rear cushioning member 7 is attached even to the rear surface of the wing 4, and thus, the noise generated when opening the opening/closing door 10 can be reduced.

In addition, the hinge 2 is a cylindrical shaft, and the rotating pipe 3 may be made from a bushing.

That is, the bushing is one of the oilless bearings, and is penetrated and coupled by the hinge 2, which is a cylindrical shaft, and minimizes the frictional force with the hinge 2, so that when the door 10 is closed, the wind can make the rotation motion of the blades 4 more rapid.

Figure 8:
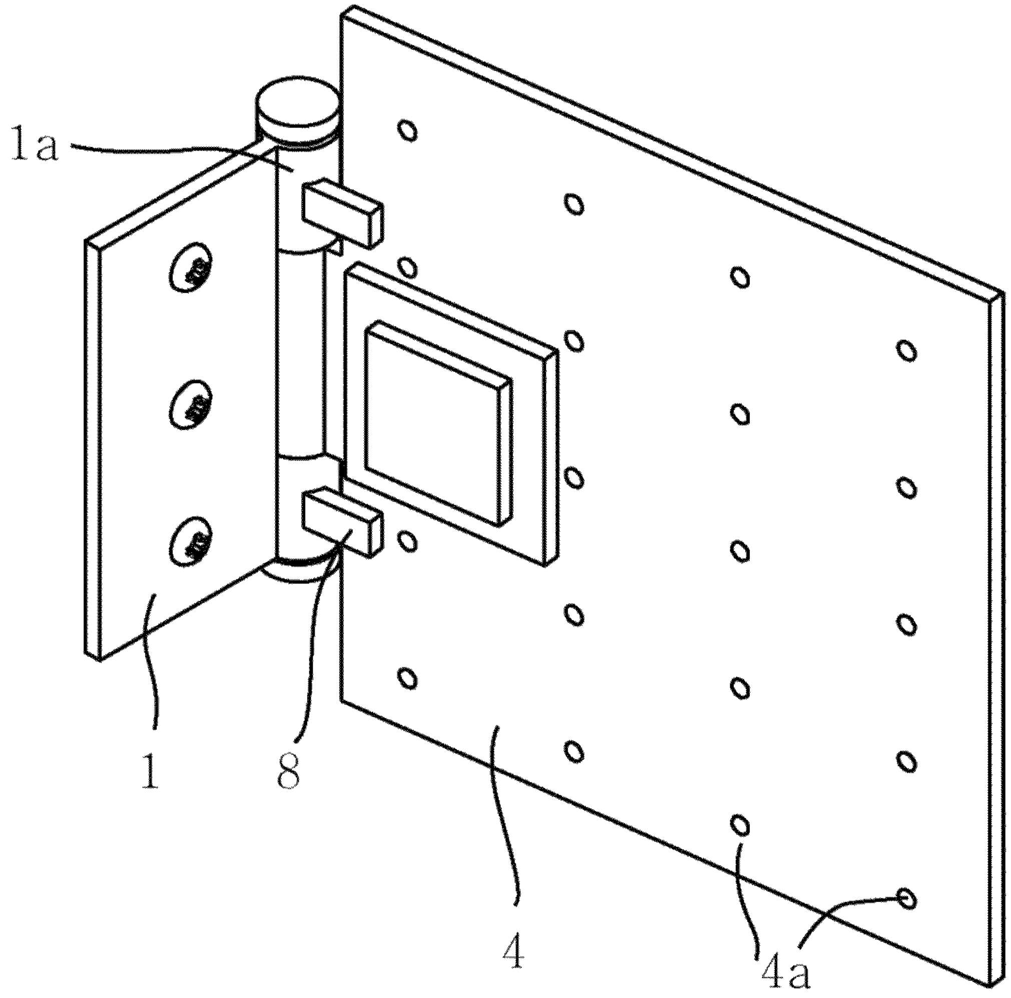
FIG. 8 is an exemplary view of another embodiment of the present invention.

FIG. 8 is an exemplary view of another embodiment of the present invention, and a plurality of aeration holes 4*a* may be formed in the wing 4.

That is, the aeration hole 4*a* allows the wind passing around the wing 4 to pass through the surface of the wing 4 to the opposite side, and thus can serve to more smoothly perform the rotational operation of the wings 4.

Next, the operation method of the present invention will be described with reference to FIGS. 5 to 7.

Figure 6:
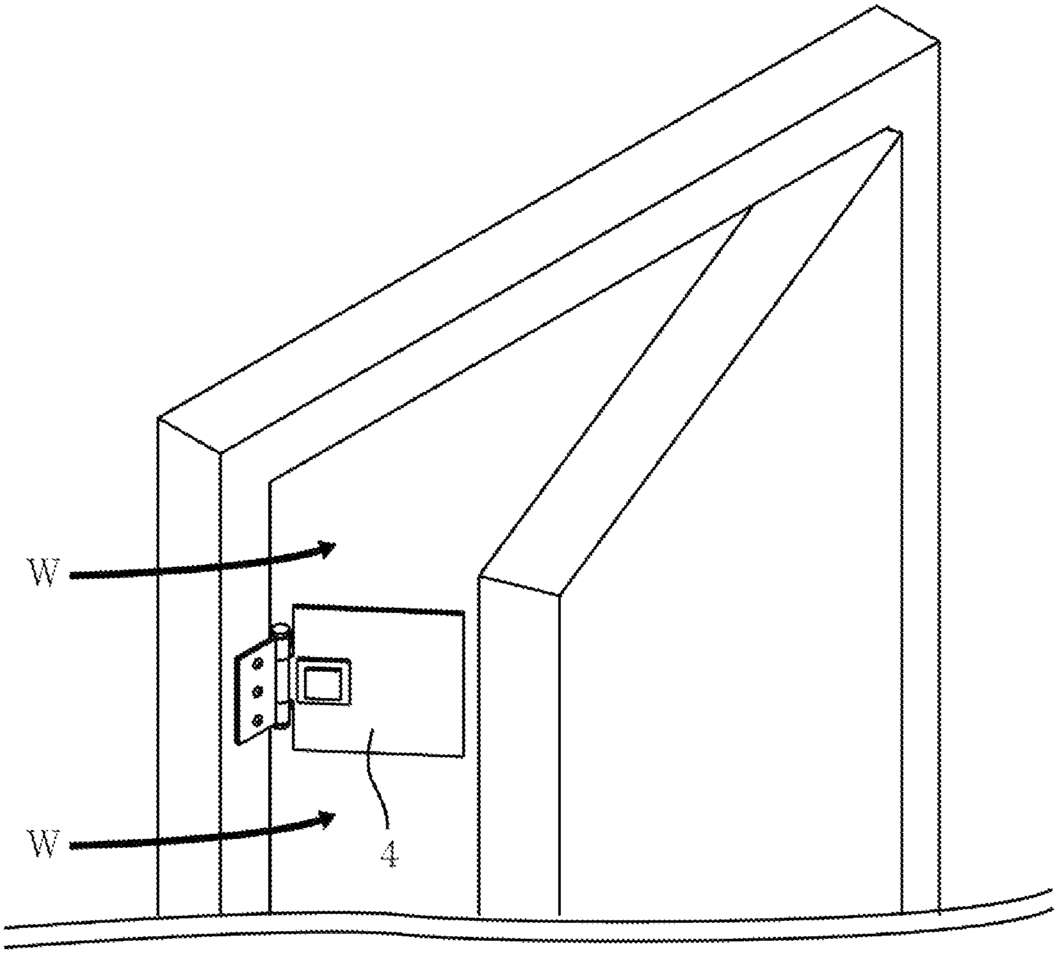
Figure 7:
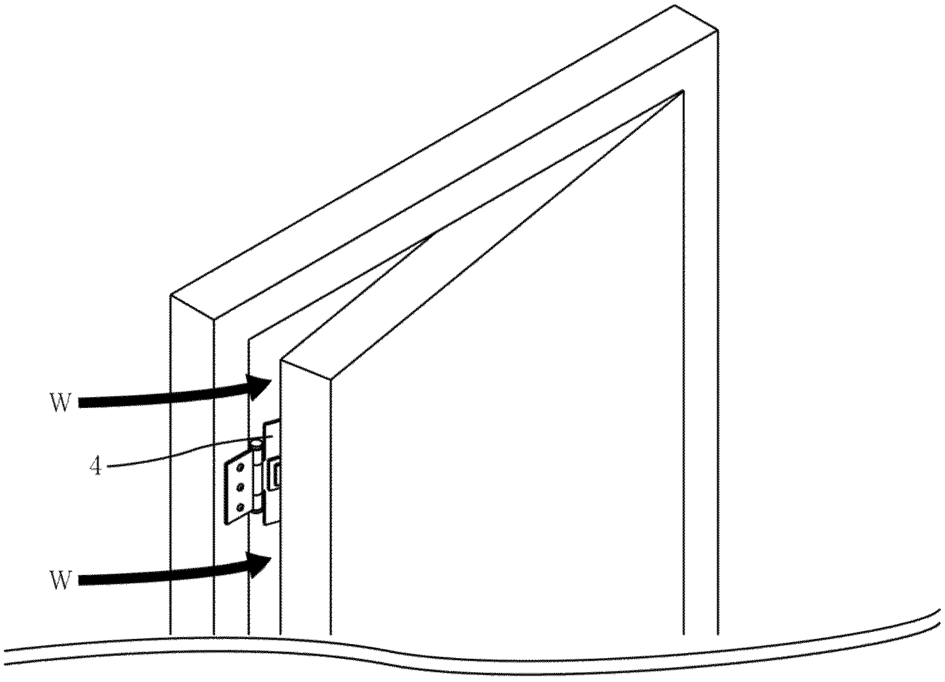

In a state where the opening/closing door 10 is left open for airing or ventilation as shown in FIG. 5, when the wind W blows in the direction of closing the opening/closing door 10 and the opening/closing door 10 is closed as shown in FIG. 6, the opening/closing door 10 is closed while air passes between the opening/closing door and the door frame 11. The wind that causes the opening/closing door 10 to close is moved at a faster wind speed as the opening/closing door 10 closes. As shown in FIG. 7, the wind W causes the wing 4 to rotate rapidly between the opening/closing door 10 and the door frame 11 around the hinge 2, so that the opening/closing door 10 is completely closed and makes first contact with the wing 4 before colliding with the door frame 11.

Therefore, the impact generated by the sudden closing of the opening/closing door 10 is absorbed by the cushion 6 and the front cushioning member 5 installed on the wings 4, thereby preventing noise from being generated.

In particular, as the opening/closing door 10 is closed, the space through which the wind W can pass between the opening/closing door 10 and the door frame 11 is reduced. The wind moves at a faster speed in the state of FIG. 7 than in the state of FIG. 5, and thus, a large rotational force is imparted to the wing 4.

In addition, the opening/closing door 10 does not completely close even by the wind of high wind speed, and therefore, it is possible to prevent safety accidents such as getting infant or children's hands caught in the door gap.

Further, referring to FIGS. 1, 3 and 8, a fixed pipe 1*a* having the same diameter as the diameter of the rotating pipe 3 is formed on one side of the fixed plate 1, the fixed pipe 1*a* is penetrated and coupled by a hinge 2, a stopper 12 protruding with a certain length is formed in the fixed pipe 1*a*, and the stopper 12 limits the amount of rotation of the wings 4. Therefore, when the opening/closing door 10 is closed, the opening/closing door 10 restricts the wing 4 from rotating more than a specific position.

Eventually, an impact noise prevention device for an opening/closing door according to the present invention is a prevention device that is installed on a door frame of an opening/closing door to prevent sudden closing of the opening/closing door, and is configured to install wings on one side of a hinge fixed to the door frame, and allows the wings to rotate around the hinge by the force of the wind passing between the opening/closing door and the door frame, i.e. the wind force, thereby reducing the impact and noise caused by the sudden closing of the opening/closing door, and is installed in the door frame to conveniently perform its installment and removal. Further, a front cushioning member is attached to the front surface of the wing, and a cushion is attached to the front cushioning member, which absorbs the impact generated by sudden closing of the opening/closing door, thereby reducing noise, and a rear cushioning member is further attached to the rear surface of the wing, and rear cushioning member can absorb the impact generated when the opening/closing door is opened, thereby reducing the impact noise.

DESCRIPTION OF REFERENCE NUMERALS

- 1: fixed plate
- 1*a*: fixed pipe
- 2: hinge
- 3: rotating pipe
- 4: wing
- 4*a*: aeration hole
- 5: front cushioning member
- 6: cushion
- 7: rear cushioning member
- 8: stopper
- 9: bolt
- 10: opening/closing door
- 11: door frame

What is claimed is:

1. An impact noise prevention device for an opening/closing door which prevents impact and noise caused by sudden closing of the opening/closing door (10), the device comprising:

a fixed plate (1) fixed to a door frame (11) of the opening/closing door (10), a hinge (2) fixedly coupled to the fixing plate (1), a rotating pipe (3) coupled through the hinge (2) and rotated around the hinge (2), and a wing (4) fixed to the rotating pipe (3) and rotated by a force of the wind passing between the opening/closing door (10) and the door frame (11) to a position between the opening/closing door (10) and the door frame (11) to prevent closure of the opening/closing door (10) with respect to the door frame (11).

2. The impact noise prevention device for an opening/closing door according to claim 1, wherein:

a front cushioning member (5) is attached to a front surface of the wing (4), and a cushion (6) is attached to the front cushioning member (5), which absorbs an impact generated by sudden closing of the opening/closing door (10), thereby reducing noise.

3. The impact noise prevention device for an opening/closing door according to claim 2, wherein:

the front cushioning member (5) and the cushion (6) are configured such that an amount of deformation of the cushion (6) when a same force acts on a same area is greater than an amount of deformation of the front cushioning member (5).

4. The impact noise prevention device for an opening/closing door according to claim 1, wherein:

a rear cushioning member (7) is attached to a rear surface of the wing (4), and rear cushioning member (7) absorbs an impact generated when the opening/closing door (10) is opened, thereby reducing impact noise.

5. The impact noise prevention device for an opening/closing door according to claim 1, wherein:

the hinge (2) is a cylindrical shaft, and the rotating pipe (3) is a bushing.

6. The impact noise prevention device for an opening/closing door according to claim 1, wherein:

a plurality of aeration holes (4*a*) are formed in the wing (4).

* * * * *